United States Patent
Besier et al.

(10) Patent No.: US 9,845,085 B2
(45) Date of Patent: Dec. 19, 2017

(54) METHOD FOR PROVIDING HAPTIC INFORMATION FOR A DRIVER OF A MOTOR VEHICLE, AND BRAKE SYSTEM

(71) Applicant: Continental Teves AG & Co. oHG, Frankfurt (DE)

(72) Inventors: Marco Besier, Bad Schwalbach (DE); Matthias Muntu, Hofheim (DE); Georg Roll, Frankfurt (DE); Jen Jäger, Wiesbaden (DE)

(73) Assignee: CONTINENTAL TEVES AG & CO. OHG, Frankfurt (DE)

( * ) Notice: Subject to any disclaimer, the term of this patent is extended or adjusted under 35 U.S.C. 154(b) by 0 days.

(21) Appl. No.: 14/888,508

(22) PCT Filed: Mar. 5, 2014

(86) PCT No.: PCT/EP2014/054252
§ 371 (c)(1),
(2) Date: Nov. 2, 2015

(87) PCT Pub. No.: WO2014/177307
PCT Pub. Date: Nov. 6, 2014

(65) Prior Publication Data
US 2016/0152219 A1   Jun. 2, 2016

(30) Foreign Application Priority Data

May 2, 2013   (DE) .................. 10 2013 208 068
Nov. 4, 2013   (DE) .................. 10 2013 222 281

(51) Int. Cl.
*B60T 8/40* (2006.01)
*B60T 7/04* (2006.01)
(Continued)

(52) U.S. Cl.
CPC ............ *B60T 8/4081* (2013.01); *B60T 7/042* (2013.01); *B60T 13/662* (2013.01); *B60T 13/686* (2013.01); *B60T 13/745* (2013.01)

(58) Field of Classification Search
CPC ...... B60T 7/042; B60T 8/4081; B60T 13/745; B60T 13/686; B60T 13/662
(Continued)

(56) References Cited

U.S. PATENT DOCUMENTS 5,992,948 A * 11/1999 Gowda ................. B60T 8/4068
                                                   303/116.1
8,662,601 B2 * 3/2014 Nakazawa ............. B60T 8/368
                                                   188/112 R
(Continued)

FOREIGN PATENT DOCUMENTS

DE   100 15 714 A1   10/2001
DE   100 18 178 A1   10/2001
(Continued)

OTHER PUBLICATIONS

PCT International Search Report—dated Jun. 13, 2014.
German Examination Report—dated Aug. 13, 2014.

*Primary Examiner* — Thomas J Williams
*Assistant Examiner* — Mariano Sy
(74) *Attorney, Agent, or Firm* — Brinks Gilson & Lione

(57) ABSTRACT

A method and a brake system for providing haptic information for a driver of a motor vehicle equipped with a brake-by-wire brake system concerning an operational state of the brake system. The brake system has a main brake cylinder which can be actuated by a brake pedal, having at least one pressure chamber associated with at least one wheel brake, and a simulation device which co-operates with the main brake cylinder and gives the driver a brake pedal sensation in a brake-by-wire operating mode. When a predetermined operational state occurs in the brake-by-wire operating (Continued)

mode, a brake pedal reaction, as a change to the stiffness of the brake pedal sensed by the driver is carried out by means of a disengaging valve which is connected to the pressure chamber of the main brake cylinder and by which the action of the simulation device can be switched on and off.

11 Claims, 3 Drawing Sheets

(51) Int. Cl.
    *B60T 13/66*     (2006.01)
    *B60T 13/68*     (2006.01)
    *B60T 13/74*     (2006.01)

(58) Field of Classification Search
    USPC .............................. 303/15, 3, 20, 155, 119.1
    See application file for complete search history.

(56) References Cited

U.S. PATENT DOCUMENTS

| | | | |
|---|---|---|---|
| 9,108,604 B2 * | 8/2015 | Bohm | B60T 8/4081 |
| 9,145,119 B2 * | 9/2015 | Biller | B60T 8/4081 |
| 9,145,121 B2 * | 9/2015 | Jungbecker | B60T 7/042 |
| 9,308,905 B2 * | 4/2016 | Biller | |
| 9,315,180 B2 * | 4/2016 | Jungbecker | B60T 8/4081 |
| 9,415,758 B2 * | 8/2016 | Drumm | B60T 17/22 |
| 2007/0018498 A1 | 1/2007 | Nakazawa | |
| 2007/0205658 A1 * | 9/2007 | Sato | B60T 7/042 303/10 |
| 2007/0210648 A1 * | 9/2007 | Sato | B60T 8/4059 303/155 |
| 2010/0198476 A1 * | 8/2010 | Miyazaki | B60T 8/1766 701/78 |

FOREIGN PATENT DOCUMENTS

| | | |
|---|---|---|
| DE | 103 46 674 A1 | 1/2005 |
| DE | 10 2004 040 616 A1 | 2/2006 |
| DE | 10 2013 204 778 A1 | 9/2013 |
| EP | WO 2011/029812 A1 | 3/2011 |
| WO | WO 2012/143313 A1 | 10/2012 |

* cited by examiner

METHOD FOR PROVIDING HAPTIC INFORMATION FOR A DRIVER OF A MOTOR VEHICLE, AND BRAKE SYSTEM

CROSS REFERENCE TO RELATED APPLICATIONS

This application claims priority to German Patent Application Nos. 10 2013 208 068.9, filed Mar. 2, 2013; 10 2013 222 281.5, filed Nov. 4, 2013; and PCT/EP2014/054252, filed Mar. 5, 2014.

FIELD OF THE INVENTION

The invention relates to a method related to an operating state of a motor vehicle brake system, and also to a brake system.

BACKGROUND

Hydraulic vehicle brake systems are known that take the form of power brake systems and include—in addition to a master brake cylinder which can be actuated by muscular force, to which wheel brakes are hydraulically linked, and which provides pressure and volume for the purpose of actuating wheel brakes—a further, electrically controllable device for providing pressure and volume, which triggers the wheel brakes in a "brake-by-wire" operating mode. In the event of failure of the electrically controllable device for providing pressure and volume, an actuation of the wheel brakes is effected solely by the muscular force of the driver of the vehicle.

From WO 2011/029812 A1 an electrohydraulic brake system is known having a master brake cylinder, which can be actuated by the brake pedal, a travel simulator and a pressure-supply device. In a "brake-by-wire" operating mode the wheel brakes are pressurized by the pressure-supply device. The master brake cylinder and hence the driver of the vehicle are isolated from the wheel brakes via closed isolating valves. In the case of an anti-lock feedback control in the "brake-by-wire" operating mode, the driver therefore receives no brake-pedal reaction.

It is an object of the present invention to propose a method and a brake system that make available, in particular with simple electronic means, a haptic information channel via which, in particular during a braking operation in a "brake-by-wire" operating mode, information can be communicated in electronically controlled form to the driver without the impression of a defect arising.

In accordance with the invention this object is achieved by a method and by a brake system as described herein.

SUMMARY

The invention makes use of a release valve connected to the pressure chamber of the master brake cylinder for the purpose of providing haptic information for the driver, by means of which valve the simulation device—or, expressed otherwise, the action of the simulation device—can be switched on and off. Accordingly, a brake-pedal reaction is implemented by means of the release valve when a predetermined operating state occurs.

The invention offers the advantage of employing a simulator release valve, which is frequently present in "brake-by-wire" brake systems with brake-pedal-feel simulator, for the purpose of providing haptic information for the driver. This makes possible an inexpensive haptic information channel to the driver.

The method, in particular the brake-pedal reaction implemented by means of the release valve connected to the pressure chamber of the master brake cylinder, is preferably implemented in a "brake-by-wire" operating mode in which the driver is hydraulically decoupled or isolated from the wheel brakes of the brake system.

The brake-pedal reaction is preferably implemented in the form of a change in the stiffness of the brake pedal which is felt by the driver.

According to a development of the method according to the invention, the brake-pedal reaction is implemented by means of the release valve at the beginning of an anti-lock feedback control or at the beginning of an electronic brake-force-distribution function, so that the onset of the feedback control or of the function is communicated to the driver. Particularly preferably, the brake-pedal reaction is implemented immediately at the beginning of an anti-lock feedback control or at the beginning of an electronic brake-force-distribution function, i.e. when entering the anti-lock feedback control or brake-force-distribution function, in order that the driver is informed immediately of, for example, the locking limit of the wheel or wheels.

The brake-pedal reaction is preferably implemented by means of the release valve when an inlet valve of a wheel brake is closed in a "brake-by-wire" operating mode. Particularly preferably, the first-time closing of the inlet valve is fed back directly via the brake pedal. Particularly preferably, the brake-pedal reaction by means of the release valve is implemented when the inlet valve is closed in the "brake-by-wire" operating mode during an actuation of the brake pedal. Advantageously, a brake-pedal reaction is implemented when an inlet valve is being closed by a braking function (e.g. ABS (anti-lock feedback control) or EBD (electronic brake-force distribution)) of the brake system.

The invention preferably relates to a method for setting a suitable brake-pedal feedback for the driver during an ABS feedback control.

According to a development of the invention, by means of a passive simulator spring the simulation device generates a basic brake-pedal characteristic which assigns a pedal travel to a given pedal force in an unchanged constant relationship.

For the purpose of the brake-pedal reaction, the release valve is preferably partly and/or temporarily closed. By this means, the stiffness in the brake pedal is increased in a simple manner.

For the purpose of the brake-pedal reaction, the flow resistance of the release valve is preferably varied.

Particularly preferably, in the "brake-by-wire" operating mode the master brake cylinder is isolated from the brake circuit(s), for example by one or more isolating valves.

The pressure chamber of the master brake cylinder is preferably hydraulically connected or connectable to the simulation device via the release valve.

Alternatively, it is preferred that the pressure chamber of the master brake cylinder is hydraulically connected or connectable to a pressure-medium reservoir under atmospheric pressure via the release valve.

The invention preferably relates to a method for operating a brake system for motor vehicles that in a "brake-by-wire" operating mode can be triggered both by the driver of the vehicle and independently of the driver of the vehicle, that is preferentially operated in the "brake-by-wire" operating mode, and that can be operated in at least one fallback operating mode.

The invention also relates to a brake system in which a method according to the invention is implemented.

The brake system preferably includes an electrically actuatable inlet valve—which, in particular, is normally open—per wheel brake, for setting wheel-specific brake pressures.

The brake system preferably further includes an electrically actuatable outlet valve—which, in particular, is normally closed—per wheel brake, for setting wheel-specific brake pressures.

The brake system preferably includes a master brake cylinder with a housing and two pistons which delimit two pressure chambers in the housing, to each of which a brake circuit with wheel brakes is linkable or linked.

The brake system preferably includes an electrically controllable pressure-supply device which is connected or connectable to the brake circuit, in particular to each brake circuit.

The brake system preferably includes an electrically actuatable switching valve—which, in particular, is normally closed—per brake circuit, for hydraulic connection of the pressure-supply device to the brake circuit.

The simulation device is preferably hydraulically connected or connectable to at least one pressure chamber of the master brake cylinder.

According to a preferred embodiment of the brake system according to the invention, the pressure chamber of the master brake cylinder is hydraulically connected or connectable to the simulation device via the release valve.

Alternatively, it is preferred that the simulation device is connected or connectable to an annular hydraulic chamber of the master brake cylinder, in which case a pressurization of the chamber brings about a force, contrary to the actuating direction, on the brake-pedal-actuated piston of the master brake cylinder.

The pressure chamber of the master brake cylinder is preferably hydraulically connected or connectable to a pressure-medium reservoir under atmospheric pressure via the release valve.

The electronic control unit of the brake system is preferably designed to trigger the release valve. Advantageously, the electronic control unit is additionally designed to trigger the pressure-supply device, the isolating valves, the switching valves and the valve.

Further preferred embodiments of the invention result from the following description with reference to figures.

BRIEF DESCRIPTION OF THE DRAWINGS

Shown schematically are.

DETAILED DESCRIPTION

Figure 1:
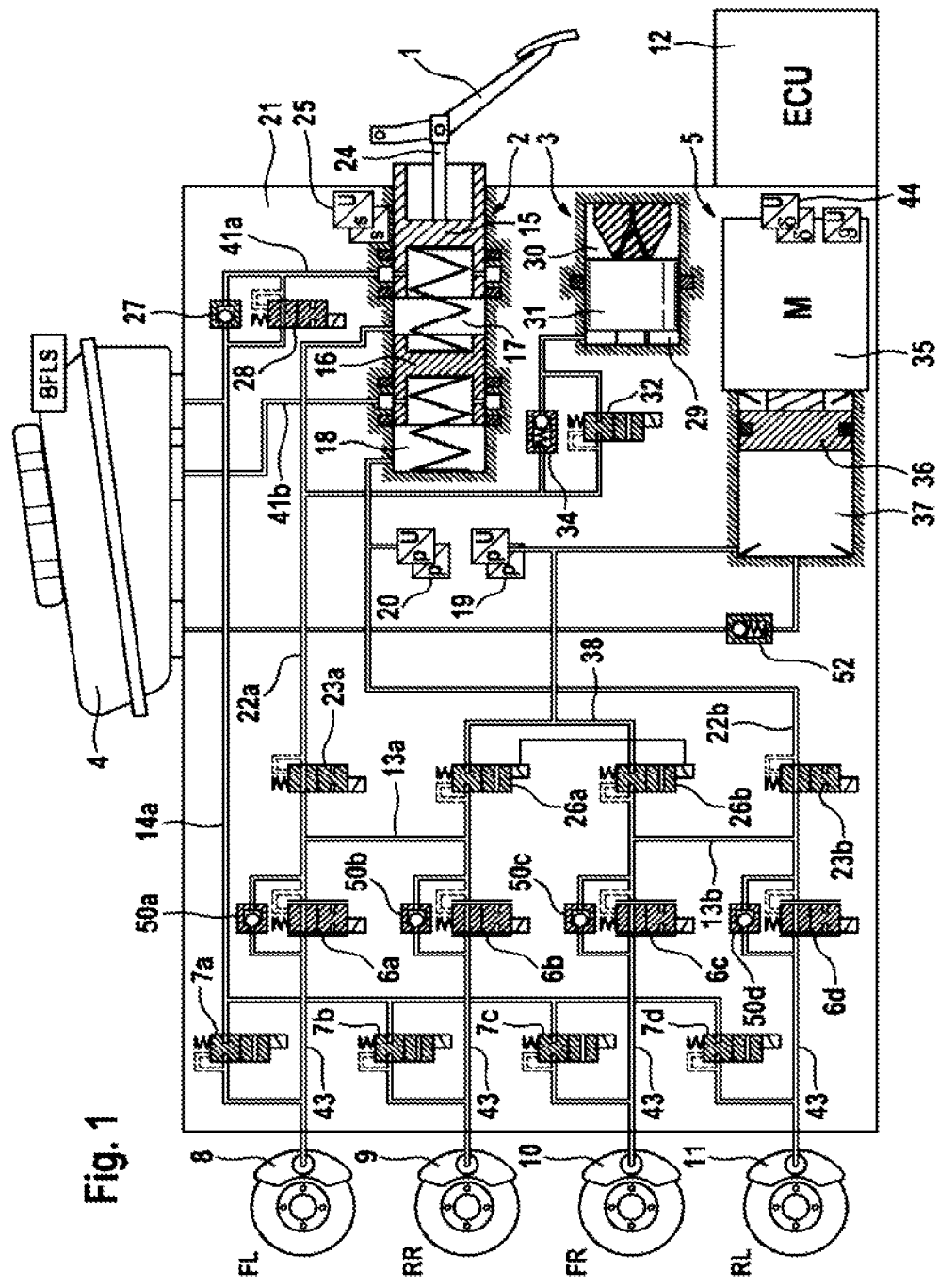
FIG. 1 shows a first embodiment of a brake system according to the invention for implementing a method according to the invention.

In FIG. 1 a first exemplary brake system for implementing a method according to the invention is represented schematically. The brake system substantially includes a hydraulic actuating unit 2, which can be actuated by means of an actuating pedal or brake pedal 1, a travel simulator or simulation device 3 interacting with the hydraulic actuating unit 2, a pressure-medium reservoir 4 under atmospheric pressure and assigned to the hydraulic actuating unit 2, an electrically controllable pressure-supply device 5, and an electrically controllable pressure-modulating device for setting wheel-specific brake pressures. The brake system further includes an electronic control unit 12.

The pressure-modulating device, which is not characterized in any detail, includes, for example per wheel brake 8, 9, 10, 11 of a motor vehicle which is not represented, an inlet valve 6a-6d and an outlet valve 7a-7d, which are hydraulically interconnected in pairs via central junctions and linked to the wheel brakes 8, 9, 10, 11. The input junctions of the inlet valves 6a-6d are supplied by means of brake-circuit supply lines 13a, 13b with pressures that are drawn off, in a "brake-by-wire" operating mode, from a system pressure which is present in a system-pressure line 38 linked to a pressure chamber 37 of the electrically controllable pressure-supply device 5. A check valve 50a-50d opening in the direction of the brake-circuit supply lines 13a, 13b is respectively connected in parallel to the inlet valves 6a-6d, in order that the pressure in a wheel-brake circuit 43 in normal operation is never higher than the pressure in pressure chamber 37. In an unboosted fallback operating mode, the brake-circuit supply lines 13a, 13b are pressurized via hydraulic lines 22a, 22b with the pressures of pressure chambers 17, 18 of the actuating unit 2. The output junctions of the outlet valves 7a-7d are connected to the pressure-medium reservoir 4 via a return line 14a. For the purpose of registering the system pressure prevailing in the system-pressure line 38, a pressure sensor 19 is provided which is preferentially of redundant design.

The hydraulic actuating unit 2 exhibits in a housing 21 two serially arranged pistons 15, 16 which delimit hydraulic chambers or pressure chambers 17, 18 which together with pistons 15, 16 form a dual-circuit master brake cylinder or a tandem master cylinder. Pressure chambers 17, 18 are, on the one hand, in communication with the pressure-medium reservoir 4 via radial bores formed in pistons 15, 16 as well as corresponding pressure-equalizing lines 41a, 41b, it being possible for said lines to be shut off by a relative motion of pistons 15, 16 in the housing 21, and, on the other hand, in communication with the brake-circuit supply lines 13a, 13b, already mentioned, by means of the hydraulic lines 22a, 22b. In this case a parallel connection of a normally open (NO) diagnostic valve 28 with a check valve 27 closing in the direction of the pressure-medium reservoir 4 is contained in pressure-equalizing line 41a. Pressure chambers 17, 18 accommodate return springs which are not characterized in any detail and which position pistons 15, 16 in an initial position when the master brake cylinder 2 is not being actuated. A piston rod 24 couples the pivoting motion of the brake pedal 1 as a consequence of an actuation of the pedal with the translatory motion of the first (master-brake-cylinder) piston 15, the actuation travel of which is registered by a displacement sensor 25 which is preferentially of redundant design. As a result, the corresponding piston-travel signal is a measure of the brake-pedal actuation angle. Said signal represents a braking request of a driver of the vehicle.

In the line sections 22a, 22b linked to pressure chambers 17, 18 a respective isolating valve 23a, 23b is arranged which, for example, takes the form of an electrically actuatable, preferentially normally open (NO), 2/2-way valve. The hydraulic connection between pressure chambers 17, 18 and the brake-circuit supply lines 13a, 13b can be shut off by the isolating valves 23a, 23b. A pressure sensor 20 linked to line section 22b registers the pressure built up in pressure chamber 18 by a displacement of the second piston 16. In a normal braking function of the brake system ("brake-by-wire" operating mode), the driver has been isolated from the brake circuits 13a, 13b by the isolating valves 23a, 23b.

The simulation device 3 is, for example, hydraulically coupled to the master brake cylinder 2 and consists substantially of a simulator chamber 29, a simulator-spring chamber 30 and also a simulator piston 31 separating the two chambers 29, 30 from one another. The simulator piston 31 is supported on the housing 21 by an elastic element (e.g. a spring) arranged in the simulator-spring chamber 30, which is advantageously biased. The simulator chamber 29 is connectable to the first pressure chamber 17 of the tandem master brake cylinder 2, for example by means of an electrically actuatable, advantageously normally closed, (simulator) release valve 32. When a pedal force has been predetermined and the (simulator) release valve 32 has been activated, pressure medium flows from pressure chamber 17 of the master brake cylinder into the simulator chamber 29. A check valve 34 arranged hydraulically antiparallel to the release valve 32 enables, independently of the switching status of the release valve 32, a largely unhindered backflow of the pressure medium from the simulator chamber 29 to pressure chamber 17 of the master brake cylinder. The simulation device 3 can accordingly be switched in and out by means of the release valve 32.

The electrically controllable pressure-supply device 5 takes the form of a hydraulic cylinder/piston arrangement or a single-circuit electrohydraulic actuator, the piston 36 of which can be actuated by a schematically indicated electric motor 35, with interposition of a rotary/translatory transmission which is likewise represented schematically. A rotor-position sensor, only indicated schematically, serving for registering the rotor position of the electric motor 35, is denoted by reference symbol 44. In addition, use may also be made of a temperature sensor for sensing the temperature of the winding of the motor. Piston 36 delimits a pressure chamber 37.

The actuator pressure generated by the action of the force of piston 36 on the pressure medium enclosed in pressure chamber 37 is fed into the system-pressure line 38 and registered with the system-pressure sensor 19. In the "brake-by-wire" operating mode, the system-pressure line 38 is connected to the brake-circuit supply lines 13a, 13b via the switching valves 26a, 26b. In this way, a build-up and reduction of wheel-brake pressure for all the wheel brakes 8, 9, 10, 11 is effected in the course of a normal braking operation. In the course of the reduction of pressure, the pressure medium previously displaced out of pressure chamber 37 of the actuator 5 into the wheel brakes 8, 9, 10, 11 flows back on the same path into pressure chamber 37 of the actuator 5. On the other hand, in the course of a braking operation with wheel-specifically different wheel-brake pressures regulated with the aid of the modulating valves 6a-6d, 7a-7d, the portion of pressure medium discharged via the outlet valves 7a-7d flows into the pressure-medium reservoir 4. A re-aspirating of pressure medium into pressure chamber 37 is possible by a reversing of piston 36 with switching valves 26a, 26b closed, inasmuch as pressure medium is able to flow out of the reservoir 4 into the actuator pressure chamber 37 via a re-aspirating valve 52 taking the form of a check valve opening in the direction of flow to the actuator.

The electronic control unit 12 serves for triggering the electrically actuatable components of the brake system, in particular valves 6a-6d, 7a-7d, 23a, 23b, 26a, 26b, 28, 32 and the electric motor 35 of the pressure-supply device 5.

The signals of the sensors 19, 20, 25 and 44 are also processed in the electronic control unit 12.

In a normal braking function of the brake system ("brake-by-wire" operating mode), the master brake cylinder 2, and hence the driver of the vehicle, has been decoupled from the wheel brakes 8, 9, 10, 11 by the closed isolating valves 23a, 23b, and the brake-circuit supply lines 13a, 13b have been connected via the open switching valves 26a, 26b to the pressure-supply device 5 which provides the system pressure for actuating the wheel brakes 8, 9, 10, 11. The simulation device 3 has been switched in by the open (simulator) release valve 32, so that the volume of pressure medium displaced in the master brake cylinder 2 by the actuation of the brake pedal 1 by the driver is received by the simulation device 3, and the simulation device 3 conveys a customary brake-pedal feel to the driver of the vehicle. A reduction of brake pressure in the wheel brakes 8, 9, 10, 11 can be effected, by piston 36 of the pressure-supply device 5 being moved back in the direction of the rest position (to the right in FIG. 1). But a rapid—for example, wheel-specific—reduction of brake pressure, such as is needed in the case of an ABS feedback control, is also possible via valves 6a-6d, 7a-7d, by the corresponding inlet valve 6a-6d being closed and the associated outlet valve 7a-7d being opened for a defined time. Pressure medium then flows out of the wheel brake through the outlet valve via line 14a into the pressure-medium reservoir 4.

In the case of the active brake system, the driver is accordingly isolated from the wheel-brake circuits 43 by the isolating valves 23a, 23b in the active mode (i.e. in the "brake-by-wire" operating mode). In this way, even at the beginning of an anti-lock feedback control the driver receives no haptic brake-pedal reaction by reason of closure of an inlet valve 6a-6d.

This is different in conventional (not "by-wire") brake systems with a vacuum-assisted brake booster and with a known ABS/ESC system. Here, during an actuation of the brake pedal the driver perceives an increased stiffness of the brake system at the brake pedal when one or more wheel inlet valves close at the beginning of an ABS controlled braking operation or at the beginning of an EBD function (EBD: electronic brake-force distribution). The brake-pedal travel/force characteristic is influenced by closure of one or more wheel inlet valves, insofar as the hydraulic stiffness of the system becomes greater as a result of one or more wheel brakes being uncoupled. In the conventional ABS/ESC brake system this can consequently be perceived in the brake pedal by the driver.

In order to achieve this behavior of a brake system, which is customary for the driver, a brake-pedal reaction is implemented by means of the release valve 32 connected to the pressure chamber of the master brake cylinder, for example when a predetermined operating state obtains.

According to one embodiment of the invention, for the purpose of conveying the information concerning the closing, in particular for the first time, of one or more inlet valves in the brake system during an actuation of the brake pedal—that is to say, for example, the beginning of an ABS controlled braking operation or the beginning of an EBD—the release valve 32 is utilized and suitably switched, in order to generate a suitable increase in stiffness at the brake pedal 1 and consequently to give the driver a haptic feedback that inlet valves have just been closed. The driver consequently knows that he is immediately at the locking limit of the tires. This information can be very helpful as regards drive dynamics.

The release valve is preferably a valve by means of which the pressure medium flowing off in the course of an actuation of the brake pedal (particularly in the "brake-by-wire" operating mode) out of a pressure chamber (e.g. pressure chamber 17 in FIG. 1) of the master brake cylinder can be changed or an outflow resistance of the master brake cylinder can be varied.

As a result of at least partial and/or temporary closure of the release valve 32, the flow resistance of valve 32 is increased or varied, resulting in the increase in stiffness at the brake pedal 1.

Figure 2:
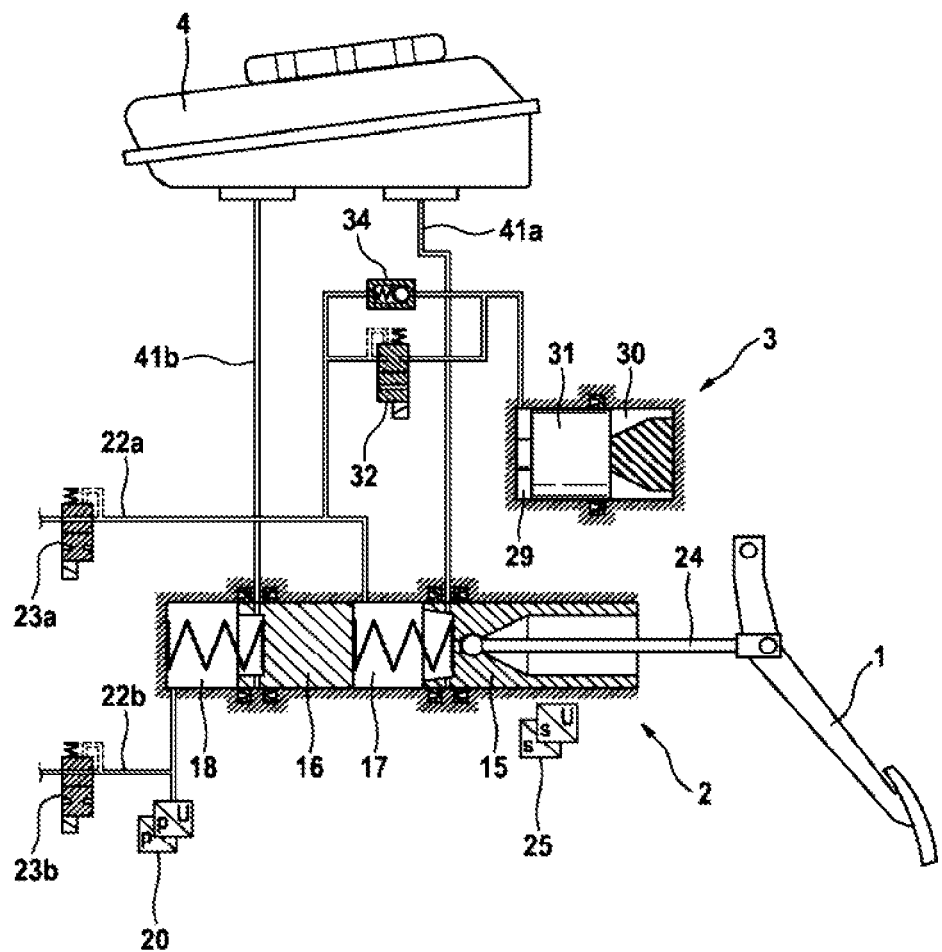
FIG. 2 shows a detail of a second embodiment of a brake system according to the invention for implementing a method according to the invention.

FIG. 2 shows a detail of a second embodiment of a brake system according to the invention for implementing a method according to the invention. In FIG. 2, substantially the master brake cylinder 2 with brake pedal 1, the simulation device 3, the pressure-medium reservoir 4 and the isolating valves 23*a*, 23*b* are represented. The second embodiment corresponds very largely to the first embodiment, though no diagnostic valve 28 with check valve 27 connected in parallel is present in pressure-equalizing line 41*a*. Also in the second embodiment, the first pressure chamber 17 of the master brake cylinder 2 is hydraulically connected to the simulator chamber 29 of the simulation device 3 via an electrically actuatable (simulator) release valve 32 with check valve 34 connected in parallel, so that the simulation device 3 can be switched in and out by means of the release valve 32.

Figure 3:
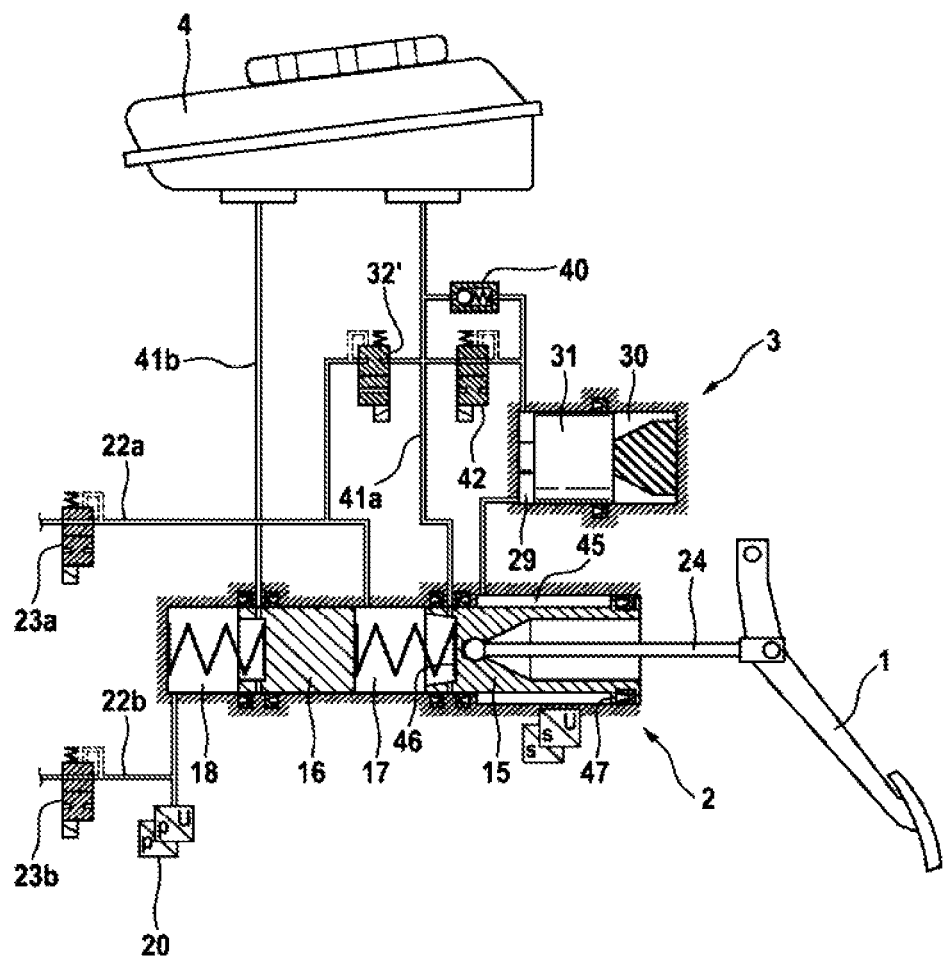
FIG. 3 shows a detail of a third embodiment of a brake system according to the invention for implementing a method according to the invention.

FIG. 3 shows a detail of a third embodiment of a brake system according to the invention for implementing a method according to the invention. Here too, substantially the master brake cylinder 2 with brake pedal 1, the simulation device 3, the pressure-medium reservoir 4 and the isolating valves 23*a*, 23*b* are represented.

The master brake cylinder 2 exhibits two serially arranged hydraulic master-brake-cylinder pistons 15, 16 which delimit hydraulic pressure chambers 17, 18. Pressure chambers 17, 18 are, on the one hand, in communication with the pressure-medium reservoir 4 via radial bores formed in the master-brake-cylinder pistons 15, 16 as well as corresponding pressure-equalizing lines 41*a*, 41*b*, it being possible for said lines to be shut off by a relative motion of pistons 15, 16, and, on the other hand, in communication with the isolating valves 23*a*, 23*b* by means of hydraulic lines 22*a*, 22*b*. The first master-brake-cylinder piston 15 mechanically coupled with the brake pedal 1 takes the form, for example, of a stepped piston with a circular surface 46 and with an annular surface 47, the circular surface 46 delimiting the first pressure chamber 17, and the annular surface 47 delimiting a hydraulic chamber 45. In this case an action of pressure in chamber 45 corresponds to a force that is acting on the first master-brake-cylinder piston 15 counter to the actuating direction. The first pressure chamber 17 and the hydraulic chamber 45 are hydraulically sealed in relation to one another.

The simulation device 3 consists substantially of a simulator chamber 29, a simulator-spring chamber 30 and also a simulator piston 31 separating the two chambers 29, 30 from one another. The simulator piston 31 is supported on the housing by an elastic element (e.g. a spring) arranged in the simulator-spring chamber 30. The simulator chamber 29 is, for example, connected, on the one hand, to the pressure-medium reservoir 4 (or to pressure-equalizing line 41*a* leading to the pressure-medium reservoir 4) by means of an electrically actuatable, advantageously normally open, valve 42 with a check valve 40 connected in parallel (closing in the direction of the pressure-medium reservoir), and, on the other hand, to the annular chamber 45 of the master brake cylinder 2.

Pressure chamber 17 of the master brake cylinder 2 is, for example, connected to the pressure-medium reservoir 4 (or to pressure-equalizing line 41*a* leading to the pressure-medium reservoir 4) via an electrically actuatable release valve 32' which is advantageously normally closed. By means of release valve 32' the simulation device 3 can be switched on and off. With release valve 32' closed, piston 15 of the master brake cylinder 2 cannot be displaced any further in the event of an actuation of the brake pedal, and hence the simulation device 3 has been switched off. With release valve 32' open, piston 15 of the master brake cylinder 2 can be displaced in the event of an actuation of the brake pedal, so that pressure medium is displaced into the simulator chamber 29 of the simulation device 3 when valve 42 is closed, the known brake-pedal feel being conveyed.

In the exemplary brake system a brake-pedal reaction is implemented by means of release valve 32' connected to the pressure chamber of the master brake cylinder when a predetermined operating state obtains.

In the course of an actuation of the brake pedal (particularly in the "brake-by-wire" operating mode), the pressure medium flowing off out of pressure chamber 17 of the master brake cylinder 2 is changed, for example, or an outflow resistance of the master brake cylinder 2 is varied. As a result of at least partial and/or temporary closure of release valve 32', the flow resistance of valve 32' is increased or varied, resulting in the increase in stiffness at the brake pedal 1.

For example, the closing—advantageously for the first time—of at least one inlet valve during an actuation of the brake pedal—that is to say, for example, the beginning of an anti-lock feedback control (ABS) or the beginning of an electronic brake-force-distribution function (EBD)—is fed back to the driver, by release valve 32 being utilized and suitably switched, in order to generate a suitable increase in stiffness at the brake pedal 1. Consequently the driver is given a haptic feedback that at least one inlet valve has just been closed.

One advantage of the invention that has been described is that no additional actuating elements—such as, for example, a supplementary actuator in the pedal-simulator unit or on the brake pedal—is needed for the haptic brake-pedal feedback. The function can be put into effect purely via software.

The release valve 32 or 32' connected to pressure chamber 17 is a valve for switching the simulation device or the brake-pedal characteristic of the simulation device on and off.

While the above description constitutes the preferred embodiment of the present invention, it will be appreciated that the invention is susceptible to modification, variation and change without departing from the proper scope and fair meaning of the accompanying claims.

The invention claimed is:

1. A method for providing haptic information for a driver of a motor vehicle equipped with a brake by wire brake system, concerning an operating state of the brake system, comprising the steps of:
   providing the brake system including a master brake cylinder, which can be actuated by a brake pedal, with at least one pressure chamber, which is connected to or connectable to at least one wheel brake, a simulation device, interacting with the master brake cylinder, which in a brake by wire operating mode conveys a brake-pedal feel to the driver, and a release valve connected to the pressure chamber of the master cylinder, by which an action of the simulation device can be switched on and off, providing a brake-pedal reaction, in the form of a change in a stiffness of the brake pedal which is felt by the driver, implementing the brake pedal reaction by operating the release valve connected to the pressure chamber of the master brake cylinder when a predetermined operating state of the brake system occurs in the brake-by-wire operating mode, and during the predetermined operating state of the brake system in the brake by wire operating mode, and during actuation of the brake pedal, closing at least one inlet valve that blocks pressure medium from reaching an associated wheel brake of the at least one wheel brake and, when the at least one inlet valve is closed, partially or temporarily closing the release valve to provide haptic feedback via the brake pedal that the at least one inlet valve has closed.

2. The method as claimed in claim 1, further comprising implementing the brake pedal reaction by operating the release valve, directly, at the beginning of an anti-lock feedback control or at the beginning of an electronic brake-force-distribution function.

3. The method as claimed in claim 1 wherein in the brake by wire operating mode, when the release valve is open, providing a brake-pedal characteristic in the form of a functional relationship between brake-pedal counterforce and brake-pedal travel generated by the simulation device.

4. The method as claimed in claim 1 further comprising generating a base brake-pedal characteristic, which assigns a pedal travel to a given pedal force in an unchanged constant relationship, by the simulation device via a passive simulator spring.

5. The method as claimed in claim 1 wherein, for the purpose of the brake-pedal reaction, partly or temporarily closing the release valve.

6. The method as claimed in claim 1 wherein, for the purpose of the brake-pedal reaction, increasing the flow resistance of the release valve.

7. A method for providing haptic information for a driver of a motor vehicle equipped with a brake by wire brake system, concerning an operating state of the brake system, comprising the steps of:

providing the brake system including a master brake cylinder, which can be actuated by a brake pedal, with at least one pressure chamber, which is connected to or connectable to at least one wheel brake, a simulation device, interacting with the master brake cylinder, which in a brake by wire operating mode conveys a brake-pedal feel to the driver, and a release valve connected to the pressure chamber of the master cylinder, by which an action of the simulation device can be switched on and off, providing a brake-pedal reaction, in the form of a change in a stiffness of the brake pedal which is felt by the driver, implementing the brake pedal reaction by operating the release valve connected to the pressure chamber of the master brake cylinder when a predetermined operating state of the brake system occurs in the brake-by-wire operating mode, and in a brake by wire operating mode, closing an inlet valve and implementing the brake-pedal reaction by operating the release valve when the inlet valve is closed.

8. The method as claimed in claim 7, further comprising, in the brake by wire operating mode, closing the inlet valve during an actuation of the brake pedal, and implementing the brake-pedal reaction by operating the release valve when the inlet valve is closed in response to a braking function or a brake-control function of the brake system.

9. A brake system for a motor vehicle comprising:

a master brake cylinder which can be actuated by a brake pedal, with at least one pressure chamber which is connected or connectable to at least one wheel brake, a simulation device interacting with the master brake cylinder, which conveys a brake-pedal feel to a driver in a brake-by-wire operating mode, with a release valve connected to the pressure chamber of the master brake cylinder, wherein the simulation device can be switched on and off, an electronic control unit configured to carry out the steps of providing a brake-pedal reaction, in response to detecting a predetermined operating state of the brake system in the brake-by-wire operating mode, in the form of a change in the stiffness of the brake pedal which is felt by the driver, implemented by operating the release valve such that the action of the simulation device can be switched on and off, and during the predetermined operating state of the brake system in the brake by wire operating mode, and during actuation of the brake pedal, closing at least one inlet valve that blocks pressure medium from reaching an associated wheel brake of the at least one wheel brake and, when the at least one inlet valve is closed, partially or temporarily closing the release valve to provide haptic feedback via the brake pedal that the at least one inlet valve has closed.

10. The brake system as claimed in claim 9, wherein the pressure chamber of the master brake cylinder is hydraulically connected or connectable to the simulation device via the release valve.

11. A brake system for a motor vehicle comprising:

a master brake cylinder which can be actuated by a brake pedal, with at least one pressure chamber which is connected or connectable to at least one wheel brake, with a simulation device interacting with the master brake cylinder, which conveys a brake-pedal feel to a driver in a brake-by-wire operating mode, with a release valve connected to the pressure chamber of the master brake cylinder, wherein the simulation device can be switched on and off, an electronic control unit configured to carry out the steps of providing a brake-pedal reaction, in the form of a change in the stiffness of the brake pedal which is felt by the driver, implemented by operating the release valve such that the action of the simulation device can be switched on and off, wherein the pressure chamber of the master brake cylinder is hydraulically connected or connectable to a pressure-medium reservoir under atmospheric pressure via the release valve.

* * * * *